United States Patent
Obitsu et al.

(10) Patent No.: US 9,932,032 B2
(45) Date of Patent: Apr. 3, 2018

(54) HYBRID VEHICLE

(71) Applicant: Toyota Jidosha Kabushiki Kaisha, Toyota-shi Aichi-ken (JP)

(72) Inventors: Mitsuhiro Obitsu, Nissin (JP); Yuka Inoshita, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/449,009

(22) Filed: Mar. 3, 2017

(65) Prior Publication Data

US 2017/0253234 A1 Sep. 7, 2017

(30) Foreign Application Priority Data

Mar. 7, 2016 (JP) .................................. 2016-043308

(51) Int. Cl.
| | |
|---|---|
| *B60W 20/10* | (2016.01) |
| *B60W 20/50* | (2016.01) |
| *B60K 6/54* | (2007.10) |
| *B60L 11/14* | (2006.01) |
| *B60L 3/08* | (2006.01) |

(52) U.S. Cl.
CPC .............. *B60W 20/50* (2013.01); *B60K 6/54* (2013.01); *B60L 3/08* (2013.01); *B60L 11/14* (2013.01); *B60W 20/10* (2013.01); *B60L 2210/30* (2013.01); *B60L 2210/40* (2013.01); *B60Y 2400/61* (2013.01)

(58) Field of Classification Search
CPC .................................. B60W 20/50; B60L 3/08
See application file for complete search history.

(56) References Cited

U.S. PATENT DOCUMENTS

| | | | | |
|---|---|---|---|---|
| 8,111,026 | B2* | 2/2012 | Kitano | B60K 6/445 318/139 |
| 9,827,857 | B2* | 11/2017 | Suzuki | H02M 7/44 |
| 2010/0070121 | A1* | 3/2010 | Ochiai | B60K 6/48 701/22 |
| 2016/0362003 | A1* | 12/2016 | Aiba | B60K 6/442 |
| 2017/0194817 | A1* | 7/2017 | Takatsu | H02J 50/12 |

FOREIGN PATENT DOCUMENTS

JP 2014-231244 A 12/2014

OTHER PUBLICATIONS

U.S. Appl. No. 15/252,762, filed Aug. 31, 2016 Inventors: Yoshikazu Asami, Daigo Ando, Hidekazu Nawata.

* cited by examiner

*Primary Examiner* — Brian L Swenson
(74) *Attorney, Agent, or Firm* — Dinsmore & Shohl LLP

(57) ABSTRACT

When there is an abnormality in communication between control units, an engine ECU performs power fixing control for keeping engine power constant, and stops the engine if the engine speed falls outside a predetermined range during execution of the power fixing control. When there is an abnormality in communication between the control units, a hybrid ECU performs rotational speed fixing control for keeping the engine speed within the predetermined range by controlling a first MG. When there is a request for stop of the engine during execution of the rotational speed fixing control, the hybrid ECU brings an inverter into a gate shutoff state, and controls a converter to increase system voltage, so as to reduce the magnitude of counter-electromotive torque.

3 Claims, 12 Drawing Sheets

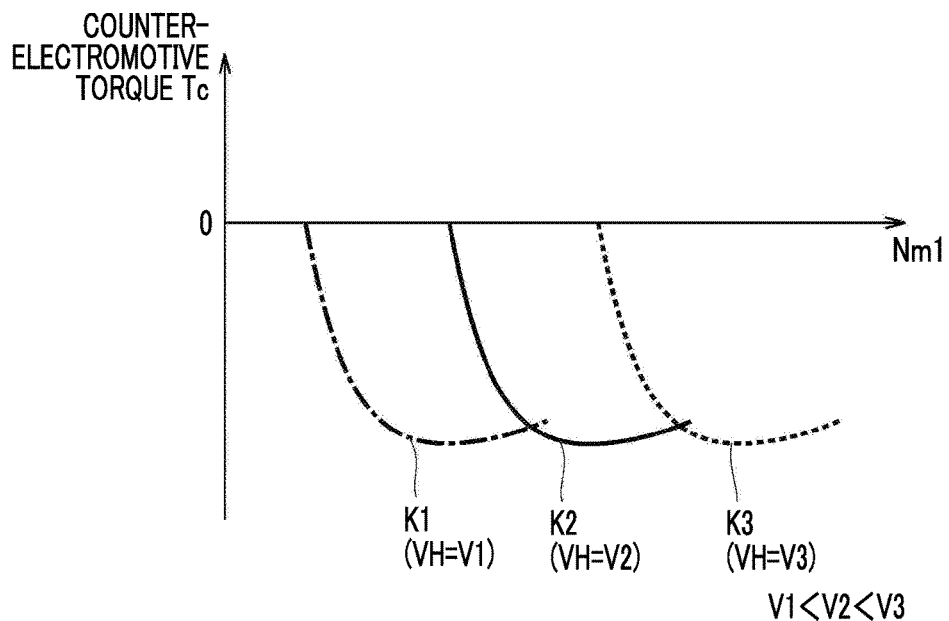
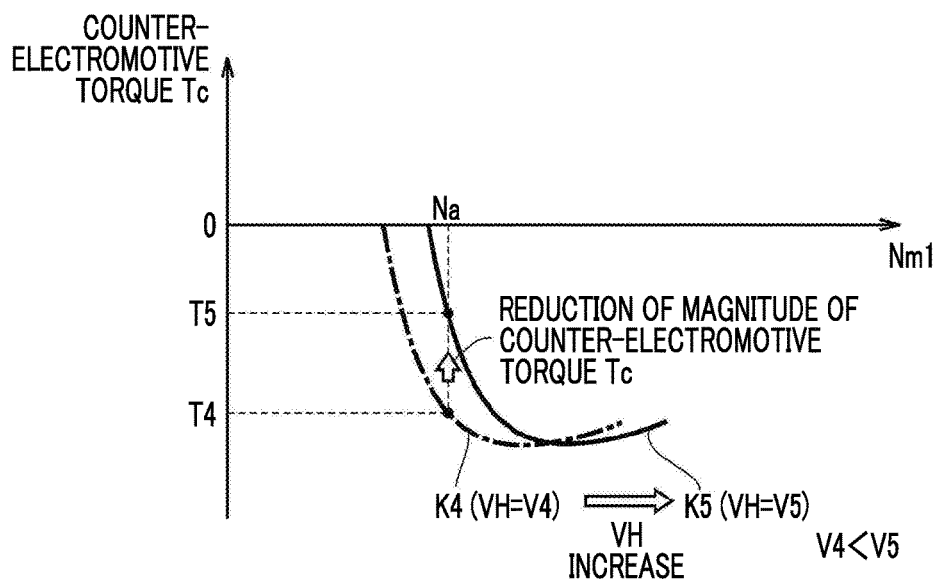

HYBRID VEHICLE

CROSS-REFERENCE TO RELATED APPLICATIONS

This application claims priority to Japanese Patent Application No. 2016-043308 filed on Mar. 7, 2016 and incorporated herein by reference in its entirety.

BACKGROUND

1. Technical Field

An embodiment relates to a hybrid vehicle using two or more control units for engine control, and more particularly relates to engine stop control when there is an abnormality in communication between the two or more control units.

2. Description of Related Art

For example, Japanese Patent Application Publication No. 2014-231244 (JP 2014-231244 A) discloses a hybrid vehicle including an engine, a first motor-generator (which will also be referred to as "first MG"), a second motor-generator (which will also be referred to as "second MG") connected to an output shaft, a planetary gear mechanism, a power storage device, an inverter, and a converter. The planetary gear mechanism mechanically couples the engine, first MG, and the output shaft. The inverter converts electric power between the power storage device, and the first MG and the second MG. The converter converts voltage between the power storage device and the inverter.

The hybrid vehicle further includes an engine control unit and a hybrid control unit. The hybrid control unit controls the first MG and the second MG, and outputs an engine command signal to the engine control unit, via communication with the engine control unit. The engine control unit controls the engine, according to the engine command signal received from the hybrid control unit.

In the hybrid vehicle disclosed in JP 2014-231244 A, when there is an abnormality in communication with the engine control unit, the hybrid control unit stops the engine by cutting off a relay for supplying electric power to fuel injection valves of the engine. Thus, even when there is an abnormality in communication between the hybrid control unit and the engine control unit, the hybrid control unit is able to directly stop the engine, without communicating with the engine control unit.

SUMMARY

If the engine is stopped when there is an abnormality in communication between the hybrid control unit and the engine control unit (which may be abbreviated to "abnormality in communication between the control units"), as is the case with the hybrid vehicle disclosed in JP 2014-231244 A, for example, the hybrid vehicle cannot travel in a limp-home mode, using power of the engine. Accordingly, even when there is an abnormality in communication between the control units, it is desirable to permit the vehicle to travel in the limp-home mode using power of the engine, and also stop the engine when a request for engine stop is generated. As a measure to meet these needs, it is considered to perform fail-safe operation as described below.

When there is an abnormality in communication between the control units, the engine control unit performs output control for operating the engine such that the output of the engine is kept constant, and stops the engine if the engine speed falls outside a predetermined range during execution of the output control. In the meantime, the hybrid control unit causes the inverter to perform switching operation, so as to perform keeping control for keeping the engine speed lower than the upper limit of the predetermined range, by applying output torque of the first MG to the planetary gear mechanism in a direction (negative direction) opposite to engine torque. Then, when a request for engine stop is generated during execution of the keeping control, the hybrid control unit shuts off gates in the inverter, so as to increase the engine speed to a value higher than the upper limit, and stop the engine.

With the arrangement as described above, the hybrid control unit can indirectly stop the engine, by adjusting the engine speed by use of power generation torque. Thus, even when there is an abnormality in communication between the control units, it is possible to permit the vehicle to travel in the limp-home mode using the power of the engine, and also stop the engine when there is a request for stop of the engine.

However, in the case where a permanent magnet is mounted in a rotor of the first MG, even if the inverter is placed in a gate shutoff state, and output of torque from the first MG is stopped, the first MG is mechanically rotated by torque of the engine if the engine is in operation, and a counter-electromotive voltage may be developed in the first MG. With the counter-electromotive voltage thus produced, a current path that extends from the first MG to a power storage device via the inverter in the gate shutoff state and the converter may be formed. Accordingly, "counter-electromotive torque" as braking torque applied in such a direction as to impede rotation of the first MG, namely, in a direction (negative direction) opposite to that of engine torque (positive torque), may be generated in the first MG. When the rotational speed of the first MG is high, the counter-electromotive torque, which is applied from the first MG to the planetary gear mechanism, may suppress or curb increase of the engine speed. As a result, the engine speed does not increase, but remains within the above-mentioned predetermined range, and the engine may not be stopped.

The embodiment provides a technology that permits a hybrid vehicle to travel in a limp-home mode using power of an engine, and also stops the engine with higher reliability when there is a request for engine stop, even when there is an abnormality in communication between two or more control units (between a hybrid control unit and an engine control unit) used for engine control.

A hybrid vehicle according to the embodiment includes an engine, a first rotating electric machine including a permanent magnet in a rotor, an output shaft connected to drive wheels, a planetary gear mechanism that mechanically couples the engine, the first rotating electric machine, and the output shaft, a second rotating electric machine connected to the output shaft, a battery, an inverter configured to convert electric power between the battery, and the first rotating electric machine and the second rotating electric machine, a converter configured to convert voltage between the battery and the inverter, a first electronic control unit configured to control the engine, and a second electronic control unit configured to control the first rotating electric machine and the second rotating electric machine. The second electronic control unit is operable to send a command signal for the engine, to the first electronic control unit. When there is an abnormality in communication with the second electronic control unit, the first electronic control unit is configured to i) perform output control for operating the engine such that output of the engine is kept substantially constant, and ii) stop the engine when a rotational speed of the engine falls outside a predetermined range during execution of the output control. When there is an abnormality in communication with the first electronic control unit, the second electronic control unit is configured to i) perform keeping control for keeping the rotational speed of the engine within the predetermined range by controlling the first rotating electric machine, ii) bring the inverter into a gate shutoff state, and iii) adjust a system voltage that is a voltage of the converter on the inverter side by controlling the convertor such that a magnitude of a counter-electromotive torque induced by a counter-electromotive voltage of the first rotating electric machine is reduced.

The magnitude of the counter-electromotive torque has a maximum value when a rotational speed of the first rotating electric machine is equal to a reference rotational speed. The reference rotational speed increases as the system voltage increases. The second electronic control unit may be configured to reduce the magnitude of the counter-electromotive torque by increasing the system voltage, when the request for stop of the engine is generated, and the rotational speed of the first rotating electric machine is lower than the reference rotational speed.

The second electronic control unit may be configured to reduce the magnitude of the counter-electromotive torque by reducing the system voltage, when the request for stop of the engine is generated, and the rotational speed of the first rotating electric machine is higher than the reference rotational speed.

When there is an abnormality in communication between the first electronic control unit and the second electronic control unit, the first electronic control unit does not stop the engine, but operates the engine under the output control. While the first electronic control unit stops the engine if the rotational speed of the engine falls outside the predetermined range, the second electronic control unit performs keeping control on the first rotating electric machine, so that the rotational speed of the engine is kept within the predetermined range. Therefore, the engine is not stopped, and the hybrid vehicle is able to travel in a limp-home mode, using power of the engine.

When there is a request for engine stop during execution of the keeping control, the second electronic control unit brings the inverter into the gate shutoff state. Then, torque (torque produced according to the required torque) is not delivered from the first rotating electric machine, but counter-electromotive torque applied in a direction opposite to that of engine torque is generated. Therefore, the second electronic control unit further controls the converter so as to adjust (increase or reduce) the system voltage, thereby to reduce the magnitude of the counter-electromotive torque. As a result, increase of the rotational speed of the engine is less likely to be suppressed by the counter-electromotive torque, and the rotational speed of the engine is increased due to the effect of the engine torque. If the rotational speed of the engine eventually falls outside the predetermined range, the engine is stopped by the first electronic control unit.

According to this embodiment, even when there is an abnormality in communication between two or more control units used for engine control, it is possible to permit the hybrid vehicle to travel in a limp-home mode using power of the engine, and also stop the engine with higher reliability when there is a request for stop of the engine.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a view useful for explaining the relationship among the system voltage, rotational speed of the first MG, and counter-electromotive torque;

FIG. 8 is a view useful for explaining control of counter-electromotive torque through increase of the system voltage;

DETAILED DESCRIPTION OF EMBODIMENTS

Figure 1:
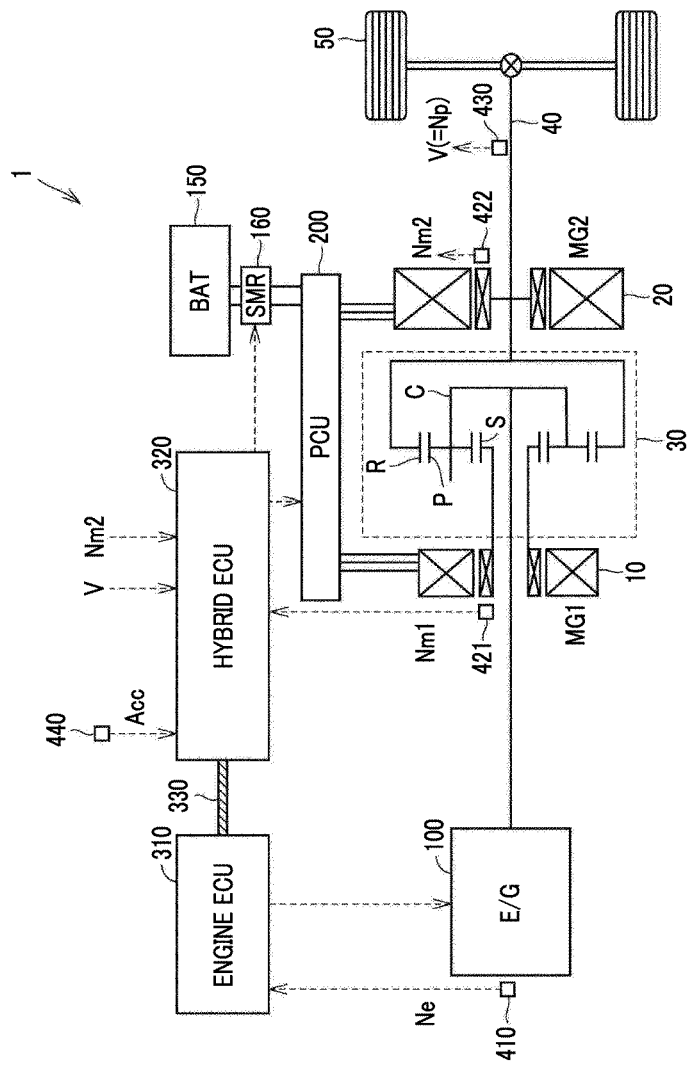
FIG. 1 is a block diagram schematically showing the overall configuration of a hybrid vehicle according to this embodiment.

One embodiment will be described in detail with reference to the drawings. In the drawings, the same reference numerals are assigned to the same or corresponding portions or components, of which explanation will not be repeated.

Embodiment

<Configuration of Hybrid Vehicle>

FIG. 1 is a block diagram schematically showing the overall configuration of a hybrid vehicle according to this embodiment. The vehicle 1 includes an engine 100, first motor-generator (first MG) 10, second motor-generator (second MG) 20, planetary gear mechanism 30, output shaft 40, drive wheels 50, power storage device 150, system main relay (SMR) 160, and a power control unit (PCU) 200. The vehicle 1 further includes an engine electronic control unit (engine ECU) 310, and a hybrid electronic control unit (hybrid ECU) 320.

The vehicle 1 travels using power of at least one of the engine 100 and the second MG 20. During normal traveling, the vehicle 1 can switch its traveling mode, between an EV (Electric Vehicle) mode in which the vehicle 1 travels using power of the second MG 20 without using power of the engine 100, and an HV (Hybrid Vehicle) mode in which the vehicle 1 travels using power of both of the engine 100 and the second MG 20.

The engine 100 is an internal combustion engine, such as a gasoline engine or a diesel engine. The engine 100 generates power with which the vehicle 1 travels in response to a control signal from the engine ECU 310, and delivers the power to the planetary gear mechanism 30.

Each of the first MG 10 and the second MG 20 is a three-phase AC motor (three-phase AC permanent magnet synchronous motor) having a permanent magnet 12 (see FIG. 5) in its rotor. The first MG 10 functions as a generator that generates electric power, using power of the engine 100 delivered to the planetary gear mechanism 30. The electric power generated by the first MG 10 is supplied to the power storage device 150 via the PCU 200. The first MG 10 also receives electric power from the power storage device 150, and rotates the crankshaft of the engine 100. Thus, the first MG 10 functions as a starter that starts the engine 100.

The second MG 20 functions as a motor that applies driving force to the drive wheels 50, using at least one of electric power stored in the power storage device 150 and electric power generated by the first MG 10. The second MG 20 also functions as a generator that generates electric power through regenerative braking. The electric power generated by the second MG 20 is supplied to the power storage device 150 via the PCU 200.

The planetary gear mechanism 30 is a single pinion planetary gear mechanism, for example, and includes a sun gear S, ring gear R, pinion gears P that mesh with the sun gear S and the ring gear R, and a carrier C that holds the pinion gears P such that the pinion gears P can rotate about themselves and rotate about the axis of the planetary gear mechanism 30. The carrier C is coupled to the engine 100. The sun gear S is coupled to the first MG 10. The ring gear R is coupled to the right and left drive wheels 50 via the output shaft 40. The second MG 20 is directly coupled to the output shaft 40.

The power storage device 150 is a DC power supply capable of charge and discharge. The power storage device 150 typically includes a battery, such as a nickel-hydrogen battery or a lithium-ion battery, but may include a capacitor, such as an electric double layer capacitor, in place of the battery. The SMR 160 electrically connects the power storage device 150 with the PCU 200, or electrically disconnects the power storage device 150 from the PCU 200, in response to a control signal from the hybrid ECU 320.

The PCU 200 converts high-voltage DC power supplied from the power storage device 150, into AC power, and delivers the AC power to the first MG 10 and/or the second MG 20. In this manner, the first MG 10 and/or the second MG 20 are driven. The PCU 200 also converts AC power generated by the first MG 10 and/or the second MG 20, into DC power, and delivers the DC power to the power storage device 150. In this manner, the power storage device 150 is charged. The PCU 200 can also drive the second MG 20, using electric power generated by the first MG 10. The configuration of the PCU 200 will be described in detail with reference to FIG. 2.

In the following description, output torque of the engine 100 will also be referred to as "engine torque Te", and output torque of the first MG 10 will also be referred to as "MG1 torque Tm1", while output torque of the second MG 20 will also be referred to as "MG2 torque Tm2". Also, output power of the engine 100 will also be referred to as "engine power Pe", and output power of the second MG 20 will also be referred to as "MG2 power Pmt". Further, the rotational speed of the engine 100 will also be referred to as "engine speed Ne", and the rotational speed of the first MG 10 will also be referred to as "MG1 speed Nm1", while the rotational speed of the second MG 20 will also be referred to as "MG2 speed Nm2".

The vehicle 1 is provided with a plurality of sensors, such as an engine speed sensor 410, resolvers 421, 422, output shaft speed sensor 430, and an accelerator position sensor 440, for detecting various kinds of information needed for control of the vehicle 1. The engine speed sensor 410 detects the engine speed Ne, and outputs the result of detection to the engine ECU 310. The resolver 421 detects the MG1 speed Nm1, and outputs the result of detection to the hybrid ECU 320. The resolver 422 detects the MG2 speed Nm2, and outputs the result of detection to the hybrid ECU 320. The output shaft speed sensor 430 detects the rotational speed Np of the output shaft 40 as the vehicle speed V, and outputs the result of detection to the hybrid ECU 320. The accelerator position sensor 440 detects the operation amount Acc of the accelerator pedal (not shown) by the user, and outputs the result of detection to the hybrid ECU 320.

Each of the engine ECU 310 and the hybrid ECU 320 incorporates a central processing unit (CPU) and a memory (not shown), and performs predetermined control, based on information stored in the memory and information received from each sensor. The control performed by each ECU will be described in detail with reference to FIG. 2.

Figure 2:
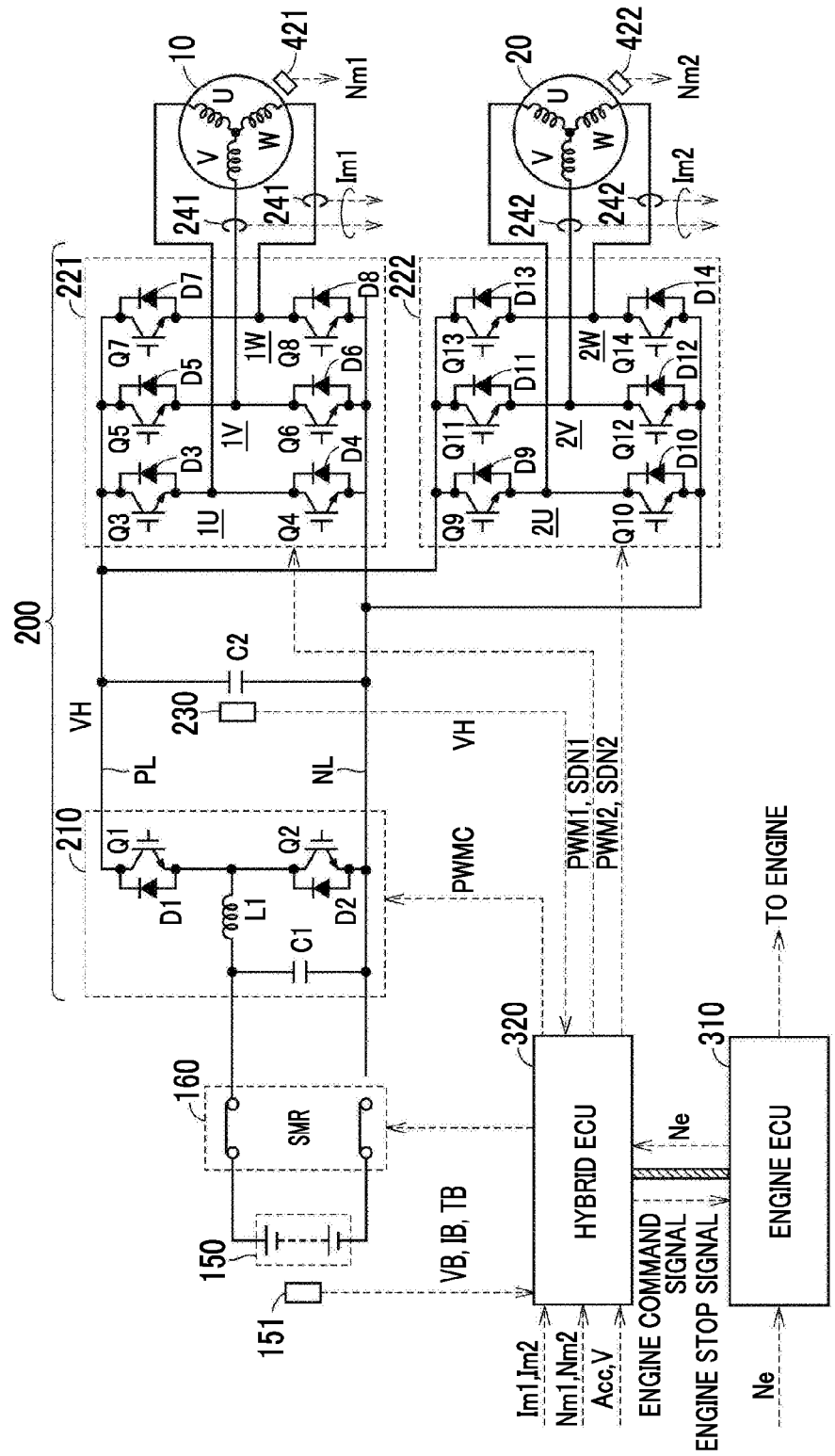
FIG. 2 is a circuit block diagram useful for explaining the configuration of a PCU and control performed by each ECU.

FIG. 2 is a circuit block diagram useful for explaining the configuration of the PCU 200 and control performed by each ECU. The PCU 200 includes a converter 210, capacitor C2, inverters 221, 222, voltage sensor 230, and current sensors 241, 242.

The power storage device 150 is provided with a monitoring unit 151. The monitoring unit 151 detects the voltage VB of the power storage device 150, input/output current IB of the power storage device 150, and the temperature TB of the power storage device 150, and outputs these results of detection to the hybrid ECU 320. The hybrid ECU 320 calculates the state of charge (SOC) of the power storage device 150, based on the detection results obtained by the monitoring unit 151.

The converter 210 includes a capacitor C1, reactor L1, switching devices Q1, Q2, and diodes D1, D2. The capacitor C1 is connected in parallel with the power storage device 150.

Each of the switching devices Q1, Q2 and switching devices Q3-Q14 that will be described later is an insulated gate bipolar transistor (IGBT), for example. The switching devices Q1, Q2 are connected in series with each other between a power line PL and a power line NL that connect the converter 210 and the inverter 221. The diodes D1, D2 are connected in inverse parallel between collectors and emitters of the switching devices Q1, Q2, respectively. One end of the reactor L1 is connected to the high-potential side of the power storage device 150. The other end of the reactor L1 is connected to a connection point between the emitter of the switching device Q1 and the collector of the switching device Q2.

The converter 210 receives a control signal PWMC of PWM (Pulse Width Modulation) type for causing each of the switching devices Q1, Q2 to perform switching operation, from the hybrid ECU 320. By causing the switching devices Q1, Q2 to perform switching operation (PWM operation) according to the control signal PWMC, the converter 210 boosts or increases the voltage VB of the power storage device 150, and supplies the boosted voltage to between the power lines PL, NL. The converter 210 also steps down or reduces the DC voltage between the power lines PL, NL, which voltage is supplied from one or both of the inverters 221, 222, and charges the power storage device 150.

The capacitor C2 is connected between the power lines PL, NL. The voltage sensor 230 detects the voltage (which will also be called "system voltage VH") between the power lines PL, NL, and outputs the result of detection to the hybrid ECU 320.

The inverter 221 includes a U-phase arm 1U, V-phase arm 1V, and a W-phase arm 1W. These arms 1U, 1V, 1W are connected in parallel with each other between the power lines PL, NL. The U-phase arm 1U has switching devices Q3, Q4 connected in series with each other. The V-phase arm 1V has switching devices Q5, Q6 connected in series with each other. The W-phase arm 1W has switching devices Q7, Q8 connected in series with each other. Between collectors and emitters of the switching devices Q3-Q8, diodes D3-D8 are connected in inverse-parallel with the switching devices Q3-Q8, respectively. One end of each of U-phase, V-phase and W-phase coils of the first MG 10 is in common connection with a neutral point. The other end of the U-phase coil is connected to an intermediate point between the switching devices Q3, Q4. The other end of the V-phase coil is connected to an intermediate point between the switching devices Q5, Q6. The other end of the W-phase coil is connected to an intermediate point between the switching devices Q7, Q8.

The inverter 221 receives a control signal PWM1 for causing each switching device Q3-Q8 to perform PWM operation, from the hybrid ECU 320. When a system voltage VH is supplied to the inverter 221, the inverter 221 converts the system voltage VH into an AC voltage according to the control signal PWM1, and operates the first MG 10 with the AC voltage. As a result, the first MG 10 produces torque (MG1 torque Tm1) according to required torque Tm1* specified by the hybrid ECU 320. On the other hand, when the inverter 221 receives a gate shutoff signal SDN1 from the hybrid ECU 320, the inverter 221 brings each switching device Q3-Q8 into a non-conducting state. Namely, the inverter 221 is placed in a gate shutoff state. Since the configuration of the inverter 222 is equivalent to that of the inverter 221, explanation will not be repeated.

The current sensor 241 detects current flowing through the first MG 10 (which will also be referred to as "motor current Im1"), and outputs the result of detection to the hybrid ECU 320. In the following description, the direction from the first MG 10 to the power storage device 150 will be denoted as the positive direction of the motor current Im1. Similarly, the current sensor 242 detects motor current Im2 flowing through the second MG 20, and outputs the result of detection to the hybrid ECU 320.

The hybrid ECU 320 calculates driving force required of the vehicle 1 by the user (which will also be referred to as "required driving force Preq"), based on the operation amount Acc of the accelerator pedal (not shown) and the vehicle speed V, for example. The hybrid ECU 320 comprehensively controls the whole vehicle 1 including the engine 100, first MG 10 and the second MG 20, so that the required driving force Preq is transmitted to the drive wheels 50.

More specifically, the hybrid ECU 320 receives a signal indicating the system voltage VH from the voltage sensor 230, signals indicating the motor currents Im1, Im2 from the current sensors 241, 242, respectively, and signals indicating the MG1 speed Nm1 and the MG2 speed Nm2 from the resolvers 421, 422, respectively. Also, the hybrid ECU 320 is connected with the engine ECU 310 via a communication line 330, and receives signals indicating conditions of the engine 100 (e.g., a signal indicating the engine speed Ne) from the engine ECU 310.

The hybrid ECU 320 divides the required driving force Preq into required power Pe* required of the engine 100, and required power Pm2* required of the second MG 20, in view of conditions of the power storage device 150, etc. Then, the hybrid ECU 320 produces an engine command signal for controlling the engine power Pe to the required power Pe*, and outputs the signal to the engine ECU 310. The engine ECU 310 controls the output (specifically, the throttle opening, ignition timing, fuel injection amount, valve timing, etc.) of the engine 100 so that the engine power Pe follows the required power Pe*, according to the engine command signal.

If the hybrid ECU 320 finds from each signal, or the like, that the engine 100 is in a situation where it should be stopped (there is a request for stop of the engine), the hybrid ECU 320 outputs an engine stop signal to the engine ECU 310. If the engine ECU 310 receives the engine stop signal, it stops the engine 100.

Further, the hybrid ECU 320 calculates the required torque Tm1* required of the first MG 10, from the required driving force Preq and each signal; for example. Then, the hybrid ECU 320 produces a control signal PWM1 and outputs it to the inverter 221, so that the MG1 torque Tm1 follows the required torque Tm1*. On the other hand, when the hybrid ECU 320 stops the first MG 10, it produces a gate shutoff signal SDN1 and outputs it to the inverter 221. Control of the inverter 222 by the hybrid ECU 320 is equivalent to that of the inverter 221, and therefore, explanation will not be repeated.

The hybrid ECU 320 also calculates a target value (which will also be referred to as "target system voltage VHtag") of the output voltage (system voltage VH) of the converter 210. Then, the hybrid ECU 320 controls the converter 210 so that the system voltage VH follows the target system voltage VHtag. More specifically, the hybrid ECU 320 performs feedback control by adjusting the duty of the output voltage of the converter 210 with the control signal PWMC so that the system voltage VH follows the target system voltage VHtag.

The engine ECU 310 and the hybrid ECU 320 correspond to "first electronic control unit" and "second electronic control unit", respectively. While the hybrid ECU 320 is illustrated as one unit, in the example shown in FIG. 1 and FIG. 2, the hybrid ECU 320 may be divided into separate units for respective functions.

<Fail-safe Operation at the Time of Communication Abnormality>

In the vehicle 1 configured as described above, if there is an abnormality in communication between the engine ECU 310 and the hybrid ECU 320 (which will also be abbreviated to "abnormality in communication between the control units"), the engine 100 cannot be appropriately controlled according to the required power Pe*. More specifically, the hybrid ECU 320 cannot send the engine command signal (signal indicating the required power Pe*) to the engine ECU 310. Since the engine ECU 310 cannot receive the engine command signal from the hybrid ECU 320, it cannot grasp how to control the engine 100.

In the above case, it may be considered that the engine ECU 310 stops the engine 100 without any exception, so as to prevent the output of the engine 100 from being excessively large. However, if the engine 100 is stopped, the vehicle 1 will not be able to travel in a limp-home mode using power of the engine 100. Accordingly, even when there is an abnormality in communication between the control units, it is desirable to permit limp-home traveling using power of the engine 100, and also stop the engine 100 when there is a request for stop of the engine. To this end, fail-safe operation as described below is performed in this embodiment.

Figure 3:
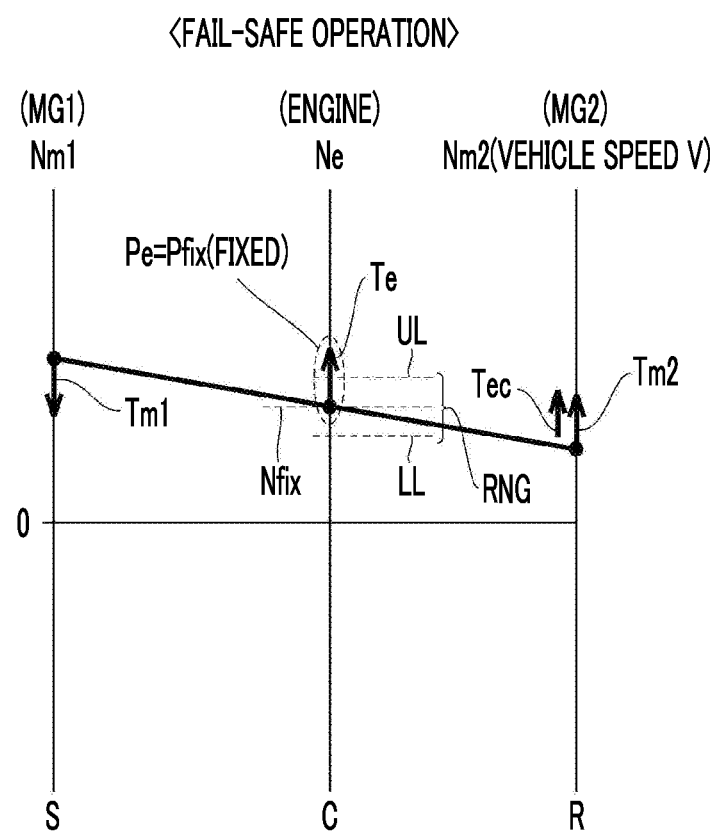
FIG. 3 is a nomographic chart of a planetary gear mechanism showing one example of operating states of an engine, a first MG and a second MG during fail-safe operation.

FIG. 3 is a nomographic chart of the planetary gear mechanism 30 showing one example of operating states of the engine 100, first MG 10, and the second MG 20 during fail-safe operation. With the engine 100, first MG 10, and the second MG 20 mechanically coupled by the planetary gear mechanism 30, the MG1 speed Nm1 (=the rotational speed of the sun gear S), the engine speed Ne (=the rotational speed of the carrier C), and the MG2 rotational speed Nm2 (=the rotational speed of the ring gear R) have a relationship that these speeds are connected by a straight line on the nomographic chart. In the following description, this relationship will also be called "relationship on the nomographic chart". According to the relationship on the nomographic chart, if any two of the rotational speeds, out of the three rotational speeds (Ne, Nm1, Nm2), are determined, the remaining one rotational speed is determined.

When there is an abnormality in communication between the control units, the engine ECU 310 operates the engine 100 so that the output of the engine 100 is kept substantially constant. What is kept constant may be the engine power Pe or the engine torque Te. In the following, the case where the engine ECU 310 performs "power fixing control" (corresponding to "output control") for operating the engine 100 so that the engine power Pe is kept at a predetermined fixed value Pfix will be described by way of example. At this time, the engine torque Te is applied to the carrier C in the positive direction.

In the meantime, the hybrid ECU 320 controls the first MG 10 so as to apply the MG1 torque Tm1 to the sun gear S in a direction (negative direction) opposite to the engine torque Te, so that the engine speed Ne is kept at a fixed value Nfix within a predetermined range RNG. The predetermined range RNG is a range in which the engine speed Ne is higher than a lower limit LL, and is lower than an upper limit UL. In the following description, this control will also be called "rotational speed fixing control (corresponding to "keeping control"). Under the rotational speed fixing control, when the MG2 speed Nm2 changes in accordance with change of the vehicle speed V, the MG1 torque Tm1 is controlled in a feedback manner so as to achieve the MG1 speed Nm1 at which the engine speed Ne can be kept at the fixed value Nfix.

When there is an abnormality in communication between the control units, the hybrid ECU 320 cannot obtain information concerning the engine speed Ne, from the engine ECU 310. However, the hybrid ECU 320 can calculate the engine speed Ne, from the MG1 speed Nm1 and MG2 speed Nm2 detected by the resolvers 421, 422, respectively, using the relationship on the nomographic chart.

When the engine 100 is operating under the power fixing control by the engine ECU 310, and the first MG 10 is operating under the rotational speed fixing control by the hybrid ECU 320, the MG1 torque Tm1 applied to the sun gear S and the engine torque Te applied to the carrier C cooperate with each other to apply directly reached torque Tec of the engine 100 to the ring gear R. The directly reached torque Tec and the torque (MG2 torque Tm2) delivered from the second MG 20 are transmitted to the drive wheels 50. The hybrid ECU 320 controls the inverter 222 so that the MG2 power Pm2 meets the required power Pm2*. If the engine power Pe becomes insufficient relative to the required power Pe* due to operation of the engine 100 under power fixing control, the MG2 power Pm2 makes up for the shortage of the engine power Pe. Thus, even when there is an abnormality in communication between the control units, the vehicle can travel in the limp-home mode, with the required driving force Preq thus satisfied by the engine power Pe and the MG2 power Pm2.

Next, control performed when the engine 100 is stopped during fail-safe operation will be described. Even when the engine 100 is brought into a situation where it should be stopped, and a request for engine stop is generated, the hybrid ECU 320 cannot send an engine stop signal to the engine ECU 310, due to an influence of the communication abnormality. Therefore, control as described below is performed.

Figure 4:
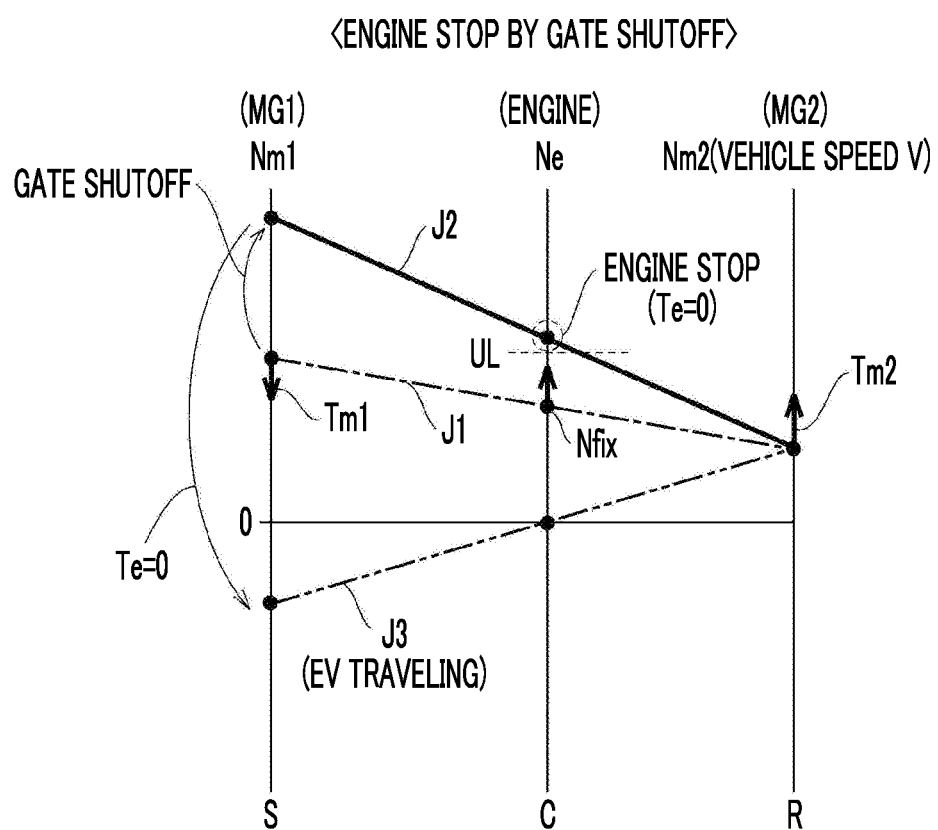
FIG. 4 is a nomographic chart of the planetary gear mechanism showing one example of operating states of the engine, first MG, and the second MG when a request for engine stop is generated during fail-safe operation.

FIG. 4 is a nomographic chart of the planetary gear mechanism 30 showing one example of operating states of the engine 100, first MG 10, and the second MG 20 in the case where a request for engine stop is generated during fail-safe operation.

When there is no request for engine stop, the engine ECU 310 causes the engine 100 to operate under power fixing control, as indicated by straight line J1 in FIG. 4. In the meantime, the hybrid ECU 320 causes the first MG 10 to operate under rotational speed fixing control, so that the MG1 torque Tm1 is applied to the sun gear S. As a result, increase of the engine speed Ne due to the engine torque Te is suppressed by the MG1 torque Tm1, and the engine speed Ne is kept at the fixed value Nfix within the predetermined range RNG.

If a request for engine stop is generated, the hybrid ECU 320 stops execution of the rotational speed fixing control of the first MG 10. Then, the hybrid ECU 320 outputs the gate shutoff signal SDN1 to the inverter 221. Then, the inverter 221 is placed in a gate shutoff state, and output of the MG1 torque Tm1 from the first MG 10 is stopped, so that increase of the engine speed Ne is less likely to be suppressed. As a result, if the engine speed Ne increases, and exceeds the upper limit UL of the predetermined range RNG, as indicated by straight line J2, the engine ECU 310 stops execution of the power fixing control of the engine 100, and stops the engine 100.

Thereafter, if the engine torque Te is reduced down to 0, limp-home traveling in the form of EV traveling is performed. The operating states where the engine torque Te becomes equal to 0, and the engine speed Ne becomes equal to 0, are indicated by straight line J3.

With the arrangement as described above, even when an abnormality arises in communication between the control units, the hybrid ECU 320 can indirectly stop the engine 100, by adjusting the engine speed Ne using the MG1 torque Tm1.

In this connection, after the hybrid ECU 320 brings the inverter 221 into the gate shutoff state, using the gate shutoff signal SDN1, during operation of the engine 100, a problem as described below may occur.

Figure 5:
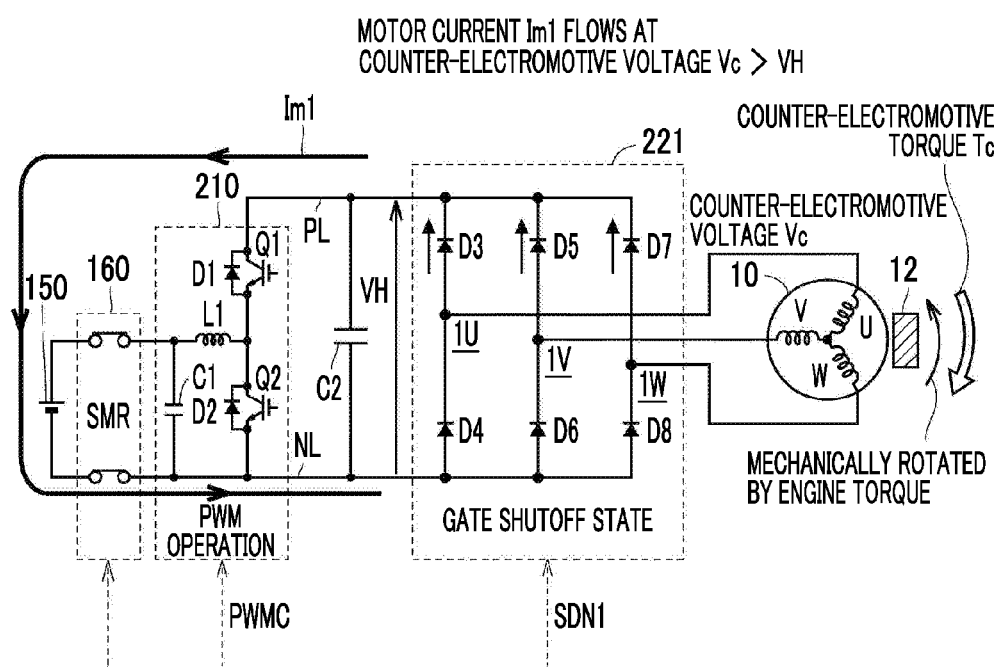
FIG. 5 is a view schematically showing the configuration of the PCU when an inverter is placed in a gate shutoff state during operation of the engine.

FIG. 5 is a circuit block diagram schematically showing the configuration of the PCU 200 in the case where the inverter 221 is placed in the gate shutoff state during operation of the engine 100. In response to the gate shutoff signal SDN1 from the hybrid ECU 320, all of the switching devices Q3-Q8 (see FIG. 2) included in the inverter 221 are brought into non-conducting states. As a result, the diodes D3-D8 included in the inverter 221 form a three-phase full-wave rectifier circuit, and output of the MG1 torque Tm1 from the first MG 10 is stopped. On the other hand, in the converter 210, the PWM operation of the switching devices Q1, Q2 according to the control signal PWMC is continued.

If the engine 100 is still in operation at this stage, engine torque Te is delivered from the engine 100. With the engine torque Te thus delivered, the first MG 10 is mechanically (dynamically) rotated. Since the permanent magnet 12 is provided in the rotor of the first MG 10, the permanent magnet 12 is rotated by the engine torque Te, and a counter-electromotive voltage Vc is generated. If the counter-electromotive voltage Vc is higher than the system voltage VH, motor current Im1 flows from the first MG 10 to the power storage device 150 via the three-phase full-wave rectifier circuit and the converter 210, and electric power is generated by the first MG 10. At this time, in the first MG 10, counter-electromotive torque Tc as braking torque applied in a direction (negative direction) to impede rotation of the first MG 10 is generated.

Figure 6:
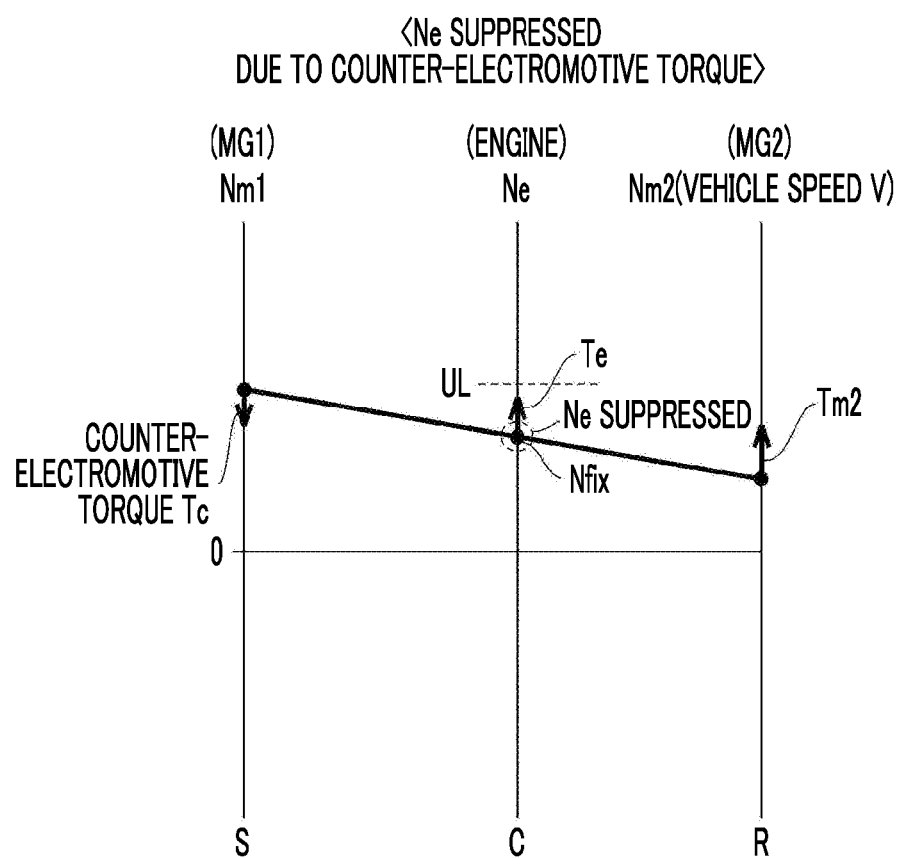
FIG. 6 is a nomographic chart of the planetary gear mechanism showing one example of operating states of the engine, first MG, and the second MG when counter-electromotive torque is generated.

FIG. 6 is a nomographic chart of the planetary gear mechanism 30 showing one example of operating states of the engine 100, first MG 10, and the second MG 20 at the time when the counter-electromotive torque Tc is generated. As shown in FIG. 6, the counter-electromotive torque Tc is applied to the sun gear S in the negative direction, and may impede increase of the engine speed Ne. Namely, even if the inverter 221 is placed in the gate shutoff state, increase of the engine speed Ne may be impeded if the engine torque Te as positive torque and the counter-electromotive torque Tc as negative torque are brought into a balanced condition. As a result, the engine speed Ne may remain within the predetermined range RNG without significantly increasing, and the engine 100 may not be stopped.

Thus, in this embodiment, when there is a request for engine stop, the hybrid ECU 320 places the inverter 221 in the gate shutoff state, and increases the system voltage VH by controlling the converter 210, so as to reduce the magnitude of the counter-electromotive torque Tc. As a result, the magnitude of the engine torque Te becomes larger than that of the counter-electromotive torque Tc, thus making it possible to increase the engine speed Ne and stop the engine 100. In the following, the reason why this control is employed will be explained in detail.

<Adjustment of System Voltage VH>

Figure 12:
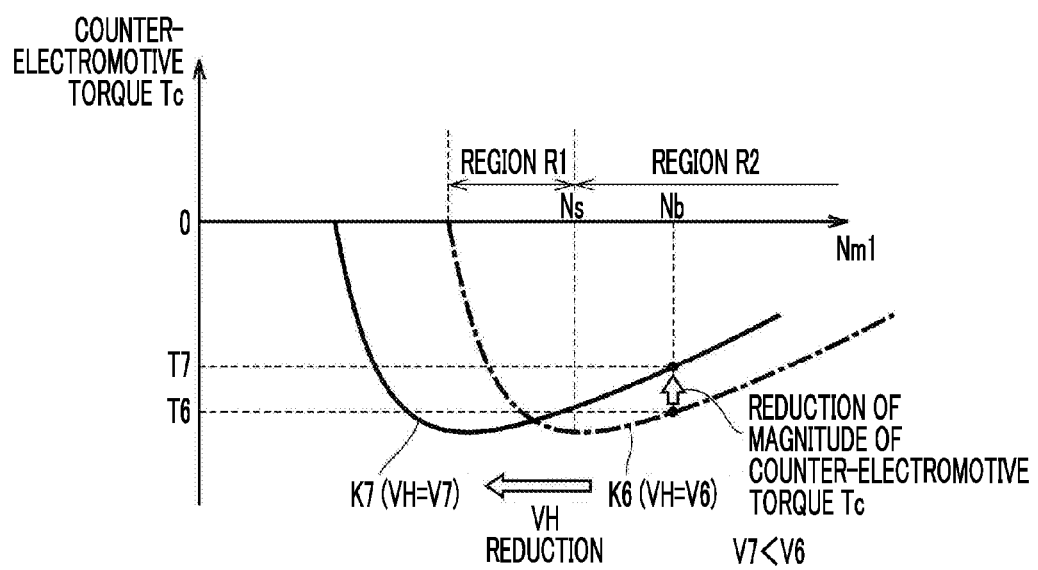
FIG. 12 is a view useful for explaining control of counter-electromotive torque Tc through reduction of the system voltage.

FIG. 7 is a view useful for explaining the relationship among the system voltage VH, MG1 speed Nm1, and the counter-electromotive torque Tc. In FIG. 7, and FIG. 8 and FIG. 12 that will be described later; the horizontal axis indicates the MG1 speed Nm1, and the vertical axis indicates the counter-electromotive torque Tc. Curves K1, K2, K3 represent characteristics of the counter-electromotive torque Tc when the system voltage VH is equal to V1, V2, and V3 (V1<V2<V3), respectively.

As indicated by the curves K1, K2, K3, the counter-electromotive torque Tc has a characteristic that it shifts in the positive direction of the MG1 speed Nm1 as the system voltage VH increases. On any of the curves K1-K3, when the MG1 speed Nm1 is lower than a reference rotational speed, the magnitude (absolute value) of the counter-electromotive torque Tc increases as the MG1 speed Nm1 increases. When the MG1 speed Nm1 reaches the reference rotational speed, the magnitude of the counter-electromotive torque Tc assumes the maximum value (the largest value). By using the characteristics of the counter-electromotive torque Tc, it is possible to control the counter-electromotive torque Tc by increasing (adjusting) the system voltage VH.

FIG. 8 is a view useful for explaining control of the counter-electromotive torque Tc through increase of the system voltage VH. In FIG. 8, curves K4, K5 indicate characteristics of the counter-electromotive torque Tc when the system voltage VH is equal to V4, V5 (V4<V5), respectively.

For example, if the converter 210 is controlled so as to increase the system voltage VH from V4 to V5, when the MG1 speed Nm1 is kept substantially constant at Na (Nm1=Na), the counter-electromotive torque Tc changes from T4 to T5. Namely, the magnitude of the counter-electromotive torque Tc is reduced. As a result, increase of the engine speed Ne due to the engine torque Te is less likely to be suppressed by the counter-electromotive torque Tc. Accordingly, the engine speed Ne is less likely to remain lower than the upper limit UL.

<Control Flow at the Time of Abnormality in Communication Between Control Units>

In the following, control routines executed when the engine ECU 310 and the hybrid ECU 320 perform the above-described controls will be described in detail with reference to flowcharts.

Figure 9:
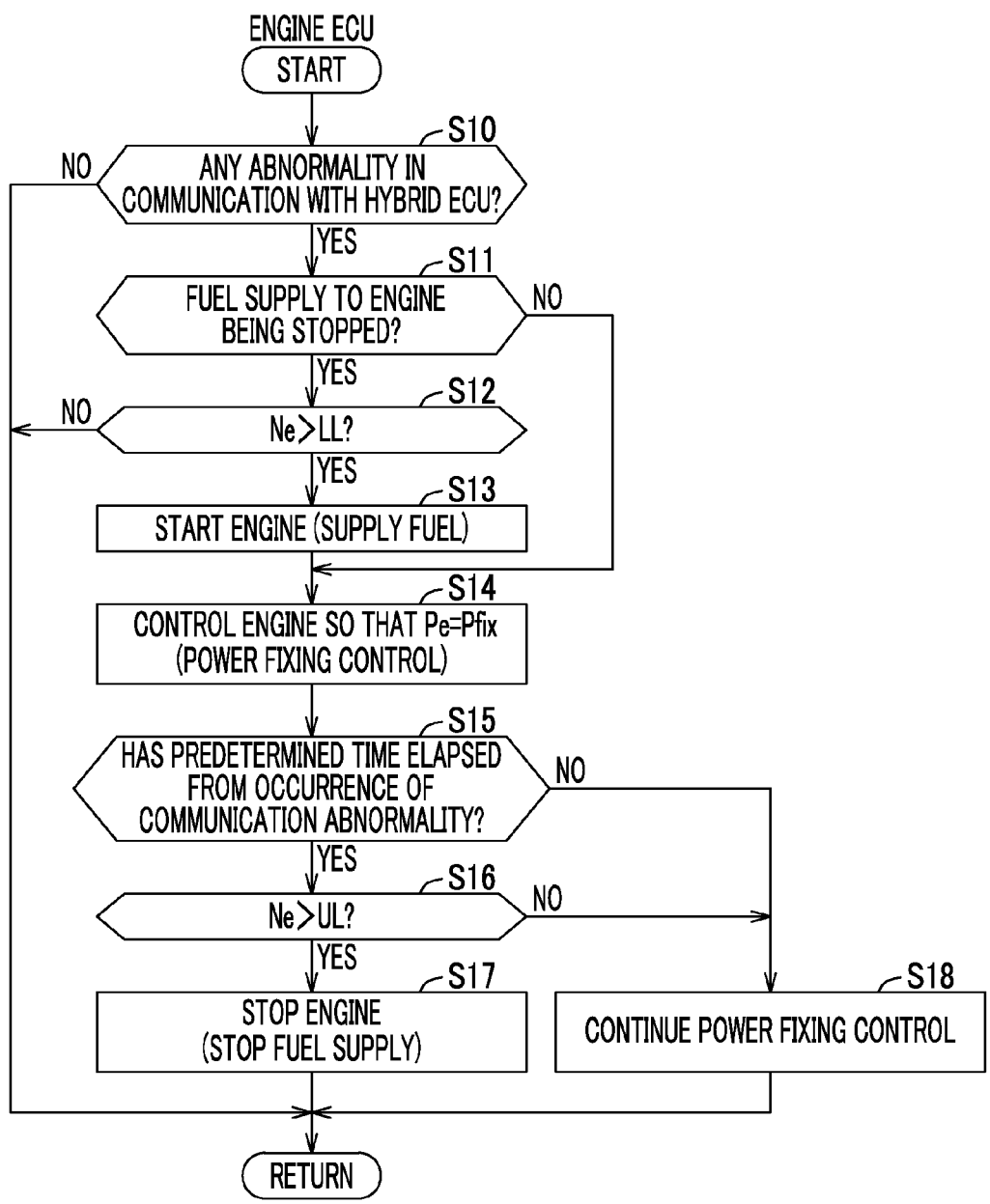
FIG. 9 is a flowchart illustrating a control routine executed by an engine ECU.

FIG. 9 is a flowchart illustrating a control routine executed by the engine ECU 310. The control routines illustrated in the flowcharts of FIG. 9, and FIG. 10 and FIG. 13 that will be described later, are called for from a main routine and repeatedly executed at intervals of a given period or each time a certain condition is satisfied. While each step (which will be abbreviated to "S" when appropriate) included in these flowcharts is basically implemented through software processing by the engine ECU 310 or the hybrid ECU 320, a part or all of the steps may be implemented by hardware (electric circuits) fabricated in the engine ECU 310 or the hybrid ECU 320.

In step S10, the engine ECU 310 determines whether there is an abnormality in communication with the hybrid ECU 320. When the engine ECU 310 continuously fails to receive information from the hybrid ECU 320 for a given period of time, for example, the engine ECU 310 determines that there is an abnormality in communication with the hybrid ECU 320.

If there is no abnormality in communication with the hybrid ECU 320 (NO in step S10), the engine ECU 310 returns to the main routine. In this case, normal operation of the engine 100 is performed, such that the engine operating point lies on a command operating point received from the hybrid ECU 320, though not illustrated in the drawings.

If there is an abnormality in communication with the hybrid ECU 320 (YES in S10), the engine ECU 310 performs fail-safe operation in step S11 and subsequent steps. More specifically, the engine ECU 310 determines whether supply of fuel to the engine 100 is being stopped (the engine 100 is under fuel-cut control) (S11).

If the engine 100 is under fuel-cut control (YES in S11), the engine ECU 310 performs engine starting control in steps S12, S13. More specifically, the engine ECU 310 determines whether the engine speed Ne is higher than the lower limit LL of the predetermined range RNG (S12). If the engine speed Ne is equal to or lower than the lower limit LL (NO in S12), the engine ECU 310 returns to the main routine. On the other hand, if the engine speed Ne is higher than the lower limit LL (YES in S12), the engine ECU 310 supplies fuel to the engine 100 and starts the engine 100 (S13). Then, the engine ECU 310 proceeds to step S14.

In step S14, the engine ECU 310 performs the above-described power fixing control. Namely, the engine ECU 310 operates the engine 100 so that the engine power Pe is kept at the predetermined, fixed value Pfix.

In step S15, the engine ECU 310 determines whether a predetermined time has elapsed from the time when the abnormality arises in communication with the hybrid ECU 320. The predetermined time is set to a length of time required to change the engine speed Ne from a value outside the predetermined range RNG to a value within the predetermined range RNG, under the above-described rotational speed fixing control (operation of step S22 of FIG. 10 which will be described later) performed by the hybrid ECU 320.

If the predetermined time has not elapsed from the time when the abnormality arises in communication between the control units (NO in S15), the engine speed Ne may not have been changed into the predetermined range RNG even once after occurrence of the communication abnormality. Therefore, the engine ECU 310 continues the power fixing control (S18).

On the other hand, if the predetermined time has elapsed from the time when the abnormality in communication between the control units arises (YES in S15), it may be considered that the time in which the engine speed Ne can be changed to a value within the predetermined range RNG after occurrence of the communication abnormality has elapsed; therefore, the engine ECU 310 determines whether the engine speed Ne exceeds the upper limit UL of the predetermined range RNG (S16). In this step, the engine ECU 310 determines whether the hybrid ECU 320 determines that there is a request for engine stop, using the engine speed Ne as a parameter (see S24-S26 in FIG. 10).

If the engine speed Ne exceeds the upper-limit UL (YES in S16), the hybrid ECU 320 may be considered to determine that there is a request for engine stop; therefore, the engine ECU 310 stops execution of the power fixing control, and stops supply of fuel to the engine 100 (S17). As a result, the engine 100 is stopped.

On the other hand, if the engine speed Ne is equal to or lower than the upper limit UL (NO in S16), the hybrid ECU 320 may be considered to determine that there is no request for engine stop (NO in S24 of FIG. 10); therefore, the engine ECU 310 continues power fixing control (S18).

Figure 10:
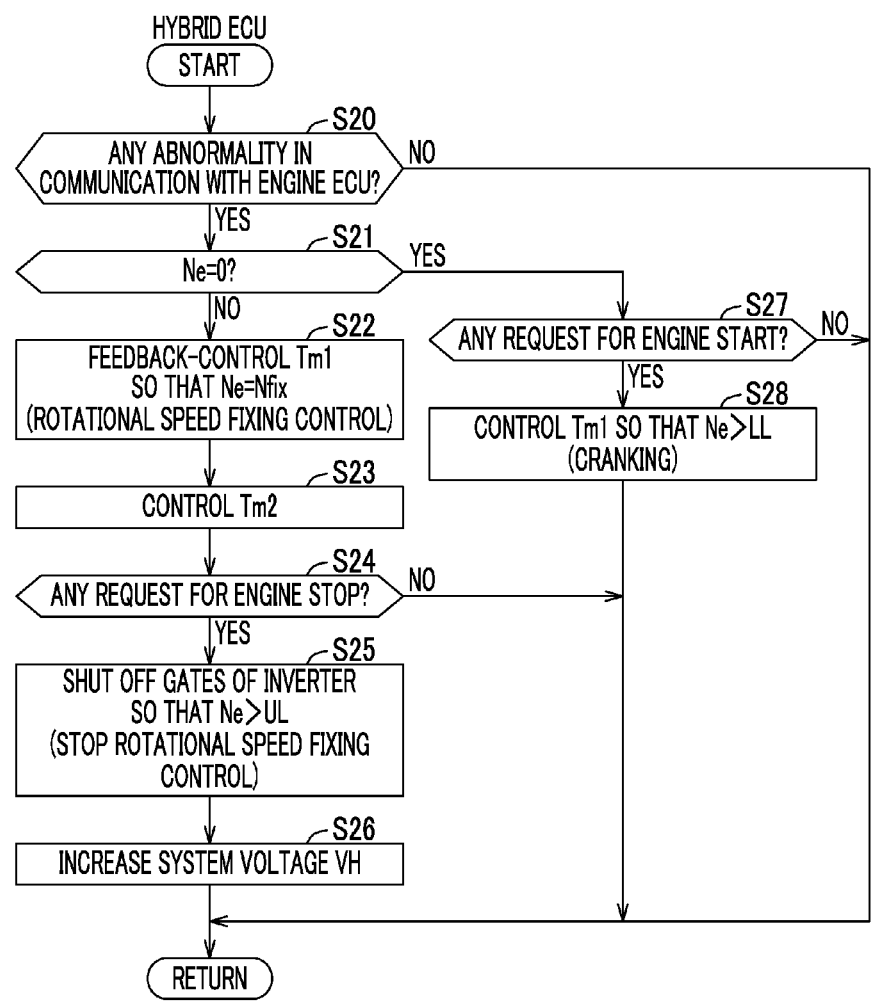
FIG. 10 is a flowchart illustrating a control routine executed by a hybrid ECU.

FIG. 10 is a flowchart illustrating a control routine executed by the hybrid ECU 320. In step S20, the hybrid ECU 320 determines whether there is an abnormality in communication with the engine ECU 310. When the hybrid ECU 320 continuously fails to receive information from the engine ECU 310 for a given period of time, for example, the hybrid ECU 320 determines that there is an abnormality in communication with the engine ECU 310.

If there is no abnormality in communication with the engine ECU 310 (NO in S20), the hybrid ECU 320 returns to the main routine. In this case, the hybrid ECU 320 controls the first MG 10 and the second MG 20 so as to satisfy the required driving force Preq, on the assumption that the engine power Pe is equal to power (required power Pe*) according to the engine command signal.

On the other hand, if there is an abnormality in communication with the engine ECU 310 (YES in S20), the hybrid ECU 320 performs fail-safe operation in step S21 and subsequent steps. More specifically, the hybrid ECU 320 determines whether the engine speed Ne is equal to 0 (whether the engine 100 is in a non-rotating state) (S21).

If the engine speed Ne is equal to 0 (YES in S21), namely, if the engine 100 is being stopped or at rest, the hybrid ECU 320 determines whether there is a request for engine start (S27). The hybrid ECU 320 determines that there is a request for engine start, when the required driving force Preq increases to be equal to or larger than a predetermined value, for example. If there is no request for engine start (NO in S27), the hybrid ECU 320 returns to the main routine. If there is a request for engine start (YES in S27), the hybrid ECU 320 controls the first MG 10 so as to perform cranking of the engine 100 (S28). Namely, the hybrid ECU 320 controls the MG1 torque Tm1 (cranking torque) so that the engine speed Ne exceeds the lower limit LL of the predetermined range RNG.

If the engine speed Ne is not equal to 0 (NO in S21), namely, if the engine 100 is rotating, the hybrid ECU 320 performs the rotating speed fixing control as described above (S22). Namely, the hybrid ECU 320 performs feedback control of the MG1 torque Tm1 so that the engine speed Ne is kept at the predetermined, fixed value Nfix. When there is an abnormality in communication between the control units, the engine 100 produces engine torque Te of the positive direction under the power fixing control; therefore, the MG1 torque Tm1 is applied in the direction (negative direction) opposite to the engine torque Te (see FIG. 3 and FIG. 4), so as to suppress increase of the engine speed Ne.

In step S23, the hybrid ECU 320 controls the MG2 torque Tm2 so as to meet the required driving force Preq, on the assumption that the engine power Pe is kept at the fixed value Pfix under the power fixing control.

In step S24, the hybrid ECU 320 determines whether there is a request for engine stop. When the required driving force Preq is reduced to be smaller than a given value, or when an abnormality arises in another control system, for example, the hybrid ECU 320 determines that there is a request for engine stop. If there is no request for engine stop (NO in S24), the hybrid ECU 320 returns to the main routine.

If there is a request for engine stop (YES in S24), the hybrid ECU 320 executes steps S25, S26, so as to make the engine speed Ne higher than the upper limit UL of the predetermined range RNG. Namely, in step S25, the hybrid ECU 320 outputs the gate shutoff signal SDN1 to the inverter 221, so as to stop execution of the rotational speed fixing control. As a result, the inverter 221 is brought into the gate shutoff state, so that the output of the MG1 torque Tm1 is stopped, while counter-electromotive torque Tc is generated as explained above with reference to FIG. 5 and FIG. 6.

In step S26, the hybrid ECU 320 controls the converter 210 so as to increase the system voltage VH. The amount of increase ΔVH of the system voltage VH is determined so as to satisfy both of the two conditions as follows.

As a first condition, the magnitude of the engine torque Te is converted into the magnitude of the MG1 torque Tm1, according to the configuration of the planetary gear mechanism 30 (specifically, the gear ratio ρ of the planetary gear mechanism 30, etc.). Then, the amount of increase ΔVH of the system voltage VH is determined so that the magnitude of the torque (positive torque) thus converted becomes larger than the magnitude of the counter-electromotive torque Tc (negative torque). In this manner, the positive torque and the negative torque are less likely or unlikely to be balanced with each other, and the engine speed Ne can be increased.

As a second condition, the amount of increase ΔVH of the system voltage VH is set to a value that enables the magnitude of the counter-electromotive torque to be reduced until the engine speed Ne exceeds the upper limit UL of the predetermined range RNG after the increase of the system voltage VH. Thus, the hybrid ECU 320 can transmit the information that the hybrid ECU 320 determines that there is a request for engine stop, to the engine ECU 310, using the engine speed Ne as a parameter.

As described above, according to this embodiment, when there is an abnormality in communication between the control units, the engine ECU 310 does not stop the engine 100, but operates the engine 100 under the power fixing control. While the engine ECU 310 stops the engine 100 when the engine speed Ne exceeds the upper limit UL of the predetermined range RNG, the engine speed Ne is kept at the fixed value Nfix within the predetermined range RNG, under the rotational speed fixing control by the hybrid ECU 320. Therefore, the engine 100 is not stopped, and the vehicle can travel in the limp-home mode, using the power of the engine 100.

Further, when there is a request for engine stop during execution of the rotational speed fixing control, the hybrid ECU 320 outputs the gate shutoff signal SDN1 to the inverter 221 so as to stop output of the MG1 torque Tm1. Then, counter-electromotive torque Tc applied in the direction opposite to the engine torque Te is generated, but the hybrid ECU 320 further controls the converter 210, so as to increase the system voltage VH and reduce the magnitude of the counter-electromotive torque Tc. As a result, increase of the engine torque Te is less likely to be suppressed by the counter-electromotive torque Tc, and therefore, the engine speed Ne increases due to the effect of the engine torque Te. If the engine speed Ne eventually exceeds the upper limit UL of the predetermined range RNG, the engine 100 is stopped by the engine ECU 310.

Thus, even in the case where the engine speed Ne does not easily increase due to the counter-electromotive torque Tc after the output of the MG1 torque Tm1 is stopped, the hybrid ECU 320 controls the converter 210 to increase the system voltage VH, so that the engine 100 can be stopped with higher reliability.

Figure 11:
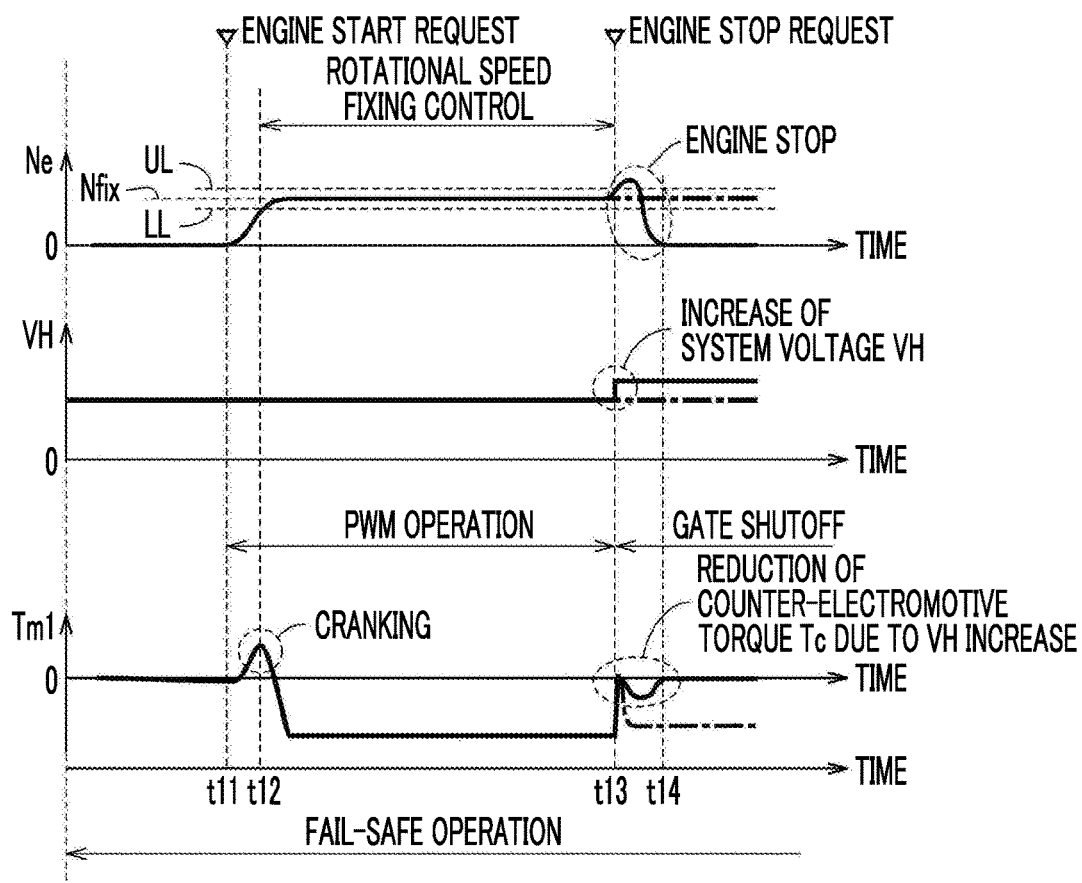
FIG. 11 is a time chart useful for explaining one example of fail-safe operation in this embodiment.

FIG. 11 is a time chart useful for explaining one example of fail-safe operation in this embodiment. In FIG. 11, the horizontal axis indicates the elapsed time. The vertical axes indicate the engine speed Ne, system voltage VH, and the MG1 torque Tm1, in this order as viewed from the top. In FIG. 11, a comparative example in which the engine speed Ne is not increased and the engine 100 is not stopped is indicated by one-dot chain lines.

Before time t11, fail-safe operation is being performed, but the required driving force Preq is low, and the engine 100 is stopped.

If a request for engine start is generated due to increase of the required driving force Preq at time t11, the hybrid ECU 320 causes the first MG 10 to produce cranking torque (see time t12). As a result, if the engine speed Ne exceeds the lower limit LL, the engine ECU 310 starts the engine 100 and executes the power fixing control. Also, the hybrid ECU 320 executes the rotational speed fixing control of the first MG 10, so as to keep the engine speed Ne at the fixed value Nfix.

Thus, even when there is an abnormality in communication between the control units, the hybrid ECU 320 can indirectly start the engine 100, by causing the first MG 10 to produce cranking torque.

If a request for engine stop is generated at time t13, the hybrid ECU 320 outputs the gate shutoff signal SDN1 to the inverter 221, so as to bring the inverter 221 into the gate shutoff state. As a result, the torque (MG1 torque Tm1) produced according to the required torque Tm1* required of the first MG 10 is changed from a negative value to 0, but counter-electromotive torque Tc is generated since the first MG 10 is rotated by the engine 100. Therefore, the hybrid ECU 320 controls the converter 210 to increase the system voltage VH, so as to reduce the magnitude of the counter-electromotive torque Tc.

With the magnitude of the counter-electromotive torque Tc thus reduced, reaction force of the engine torque Te is reduced, and the engine speed Ne is more likely to increase due to the effect of the engine torque Te. If the engine speed Ne eventually exceeds the upper limit UL, the engine ECU 310 stops the engine 100 (see time t14).

As described above, according to this embodiment, the vehicle can travel in the limp-home mode using power of the engine 100 even when an abnormality arises in communication between the control units, and the engine 100 can be stopped with higher reliability when there is a request for engine stop.

Modified Example

In the above-described embodiment, the magnitude of the counter-electromotive torque Tc is reduced by increasing the system voltage VH. On the other hand, the magnitude of the counter-electromotive torque Tc may be reduced by reducing the system voltage VH, depending on characteristics of the counter-electromotive torque Tc, as will be described below.

FIG. 12 is a view useful for explaining control of the counter-electromotive torque Tc through reduction of the system voltage VH. Curves K6, K7 represent characteristics of the counter-electromotive torque Tc when the system voltage VH is equal to V6, V7 (V6>V7), respectively. In FIG. 12, the MG1 speed Nm1 at which the magnitude of the MG1 torque Tm1 assumes the maximum value, on the curve K6, is denoted as reference rotational speed Ns.

As explained above with respect to the embodiment (see FIG. 7 and FIG. 8), when the MG1 speed Nm1 is lower than the reference rotational speed Ns, the magnitude of the counter-electromotive torque Tc increases as the MG1 speed Nm1 increases. In FIG. 12, this region of the MG1 speed Nm1 is denoted as "R1". If the MG1 speed Nm1 increases to be higher than the reference rotational speed Ns, the magnitude of the counter-electromotive torque Tc decreases as the MG1 speed Nm1 increases. In FIG. 12, this region of the MG1 speed Nm1 is denoted as "R2". In many cases, the engine speed Ne=Nfix during execution of the rotational speed fixing control is relatively low, and the MG1 speed Nm1 at the time when the inverter 221 is placed in the gate shutoff state is relatively low. Accordingly, as explained above with respect to the embodiment, the first MG 10 operates in the region R1.

However, when the MG1 speed Nm1 is relatively high, and the first MG 10 operates in the region R2, control as follows is performed. Namely, in the case where the MG1 speed Nm1 is kept substantially constant at Nb (Nm1=Nb), for example; if the converter 210 is controlled so as to reduce the system voltage VH from T6 to T7, the counter-electromotive torque Tc changes from T6 to T7 in the positive direction, and the magnitude of the counter-electromotive torque Tc is reduced. As a result, increase of the engine speed Ne is less likely to be suppressed by the counter-electromotive torque Tc, and the engine speed Ne increases. Consequently, the engine speed Ne is less likely to remain under the upper limit UL.

Next, control routines executed by the engine ECU 310 and the hybrid ECU 320 in the modified example will be described. A control routine executed by the engine ECU 310 is substantially identical with the control routine as described above with reference to FIG. 9, and therefore, explanation will not be repeated.

Figure 13:
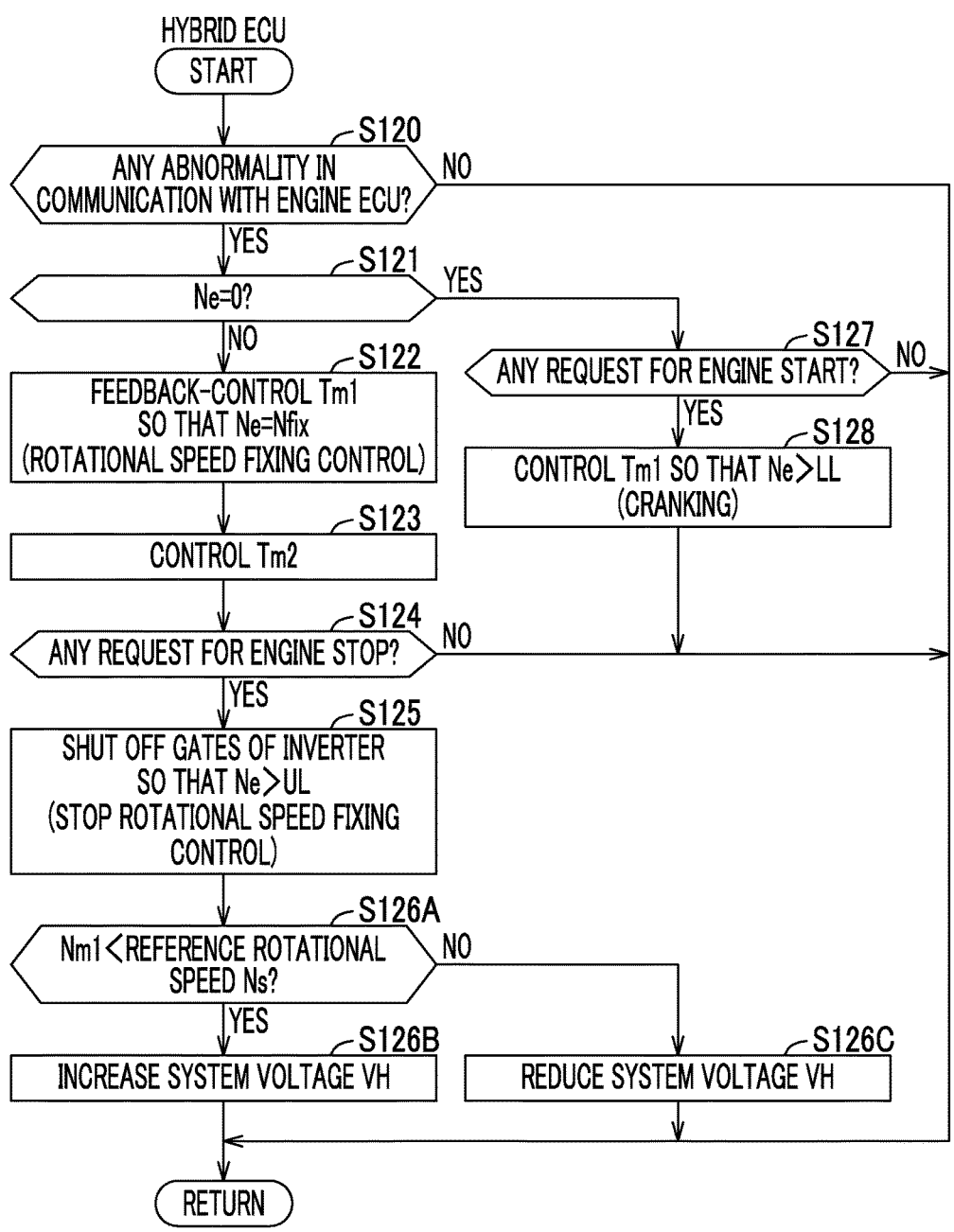
FIG. 13 is a flowchart illustrating a control routine executed by the hybrid ECU in a modified example.

FIG. 13 is a flowchart illustrating a control routine executed by the hybrid ECU 320 in the modified example. In FIG. 13, steps S120 through S125, and steps S127, S128 are substantially identical with the corresponding steps S20 through S25, and steps S27, 28 of the embodiment, and therefore, explanation of these steps will not be repeated.

If there is a request for engine stop in step S124 (YES in S124), the hybrid ECU 320 outputs the gate shutoff signal SDN1 to the inverter 221, so as to stop execution of the rotational speed fixing control (S125). As a result, the inverter 221 is placed in the gate shutoff state, and output of the MG1 torque Tm1 is stopped, while the counter-electromotive torque Tc is generated.

In step S126A, the hybrid ECU 320 determines whether the MG1 speed Nm1 is lower than the reference rotational speed Ns. Since the reference rotational speed Ns is determined according to the system voltage VH, the reference rotational speed Ns can be calculated from the system voltage VH, if the relationship between the reference rotational speed Ns and the system voltage VH is stored in advance in a memory (not shown) of the hybrid ECU 320.

If the MG1 speed Nm1 is lower than the reference rotational speed Ns (YES in step S126A), the hybrid ECU 320 controls the converter 210 so as to increase the system voltage VII (S126B), as in the above-described embodiment (see FIG. 8). As a result, the magnitude of the counter-electromotive torque-Tc is reduced.

On the other, hand, if the MG1 speed Nm1 is equal to or higher than the reference rotational speed Ns (NO in S126A), the hybrid ECU 320 controls the converter 210 so as to reduce the system voltage VH (S126C) (see FIG. 12). As a result, the magnitude of the counter-electromotive torque Tc is reduced.

Thus, the direction of adjustment of the system voltage VH is determined as needed according to characteristics of the counter-electromotive torque Tc. Since the magnitude of the counter-electromotive torque Tc is reduced by changing the system voltage VH in an appropriate direction, the engine speed Ne is increased so that the engine 100 can be stopped.

It is to be understood that the embodiments disclosed herein are merely exemplary and not restrictive in all respects. The scope of the invention is defined by the appended claims, rather than the above description of the embodiments, and is intended to include all changes within the meaning and scope equivalent to those of the claims.

What is claimed is:

1. A hybrid vehicle comprising:
an engine;
a first rotating electric machine including a permanent magnet in a rotor;
an output shaft connected to drive wheels;
a planetary gear mechanism configured to mechanically couple the engine, the first rotating electric machine, and the output shaft;
a second rotating electric machine connected to the output shaft;
a battery;
an inverter configured to convert electric power between the battery, and the first rotating electric machine and the second rotating electric machine;
a converter configured to convert voltage between the battery and the inverter;
a first electronic control unit configured to control the engine; and
a second electronic control unit configured to control the first rotating electric machine and the second rotating electric machine, the second electronic control unit being configured to send a command signal for the engine, to the first electronic control unit,
the first electronic control unit being configured to, when there is an abnormality in communication with the second electronic control unit,
i) perform output control for operating the engine such that output of the engine is kept substantially constant, and
ii) stop the engine when a rotational speed of the engine falls outside a predetermined range during execution of the output control, and
the second electronic control unit being configured to, when there is an abnormality in communication with the first electronic control unit,
i) perform keeping control for keeping the rotational speed of the engine within the predetermined range by controlling the first rotating electric machine,
ii) bring the inverter into a gate shutoff state, when there is a request for stop of the engine during execution of the keeping control, and
iii) adjust a system voltage that is a voltage of the converter on the inverter side by controlling the converter such that a magnitude of a counter-electromotive torque induced by a counter-electromotive voltage of the first rotating electric machine is reduced.

2. The hybrid vehicle according to claim 1, wherein
the magnitude of the counter-electromotive torque has a maximum value when a rotational speed of the first rotating electric machine is equal to a reference rotational speed,
the reference rotational speed increases as the system voltage increases, and
the second electronic control unit is configured to reduce the magnitude of the counter-electromotive torque by increasing the system voltage, when the request for stop of the engine is generated, and the rotational speed of the first rotating electric machine is lower than the reference rotational speed.

3. The hybrid vehicle according to claim 2, wherein
the second electronic control unit is configured to reduce the magnitude of the counter-electromotive torque by reducing the system voltage, when the request for stop of the engine is generated, and the rotational speed of the first rotating electric machine is higher than the reference rotational speed.

* * * * *

UNITED STATES PATENT AND TRADEMARK OFFICE
CERTIFICATE OF CORRECTION

PATENT NO. : 9,932,032 B2
APPLICATION NO. : 15/449009
DATED : April 3, 2018
INVENTOR(S) : Mitsuhiro Obitsu and Yuka Inoshita It is certified that error appears in the above-identified patent and that said Letters Patent is hereby corrected as shown below:

In Column 5, Line 65, delete "Pmt" and insert --Pm2--, therefor.

Signed and Sealed this
Fifteenth Day of May, 2018

Andrei Iancu
*Director of the United States Patent and Trademark Office*